United States Patent
Martens et al.

(10) Patent No.: US 11,520,935 B2
(45) Date of Patent: Dec. 6, 2022

(54) METHODS AND APPARATUS FOR PERFORMING SECURE BACK-UP AND RESTORE

(71) Applicant: INTERDIGITAL MADISON PATENT HOLDINGS, SAS, Paris (FR)

(72) Inventors: David Martens, Evergem (BE); Olivier Hardouin, Wezembeek Oppem (BE)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 151 days.

(21) Appl. No.: 16/476,585

(22) PCT Filed: Jan. 9, 2018

(86) PCT No.: PCT/EP2018/050474
§ 371 (c)(1),
(2) Date: Jul. 9, 2019

(87) PCT Pub. No.: WO2018/127606
PCT Pub. Date: Jul. 12, 2018

(65) Prior Publication Data
US 2020/0272769 A1 Aug. 27, 2020

(30) Foreign Application Priority Data
Jan. 9, 2017 (EP) .................... 17305020

(51) Int. Cl.
*G06F 21/78* (2013.01)
*G06F 11/14* (2006.01)
(Continued)

(52) U.S. Cl.
CPC .......... *G06F 21/78* (2013.01); *G06F 11/1464* (2013.01); *G06F 11/1469* (2013.01);
(Continued)

(58) Field of Classification Search
CPC .. G06F 21/78; G06F 11/1464; G06F 11/1469; G06F 21/602; G06F 21/64;
(Continued)

(56) References Cited

U.S. PATENT DOCUMENTS

| | | | |
|---|---|---|---|
| 8,671,279 B2 | 3/2014 | Brouwer et al. | |
| 8,930,698 B2 | 1/2015 | Hunter et al. | |

(Continued)

FOREIGN PATENT DOCUMENTS

| | | |
|---|---|---|
| JP | 2002-312249 A | 10/2002 |
| JP | 2007-86997 A | 4/2007 |

(Continued)

OTHER PUBLICATIONS

Van Oorschot, et al. "Handbook of Applied Cryptography", CRC Press, 1997, 16 pages.

(Continued)

*Primary Examiner* — Mohammad W Reza
(74) *Attorney, Agent, or Firm* — Condo Roccia Koptiw LLP

(57) ABSTRACT

Back-up procedures for saving configuration data are provided, which enable the restoration of said configuration data on the device when it is reset to default, or on another device when the device is stolen or broken. Since configuration data are sensitive data, it is important to protect their confidentiality and their integrity throughout the back-up and restore process. Current solutions enable a secure back-up and restore process on the same device since the backed-up configuration data are encrypted using credentials that are only known to the device. In order to overcome these drawbacks, a solution is proposed for performing a secure back-up process which enables the restoration of the backed-up data to the same device or to a distinct device. This is made possible by using encryption keys that are common to (Continued)

a pool of devices. Those common encryption keys are provided during the manufacturing of the devices.

17 Claims, 3 Drawing Sheets

(51) Int. Cl.
    *G06F 21/60*      (2013.01)
    *G06F 21/64*      (2013.01)
    *H04L 9/06*      (2006.01)
    *H04L 9/32*      (2006.01)

(52) U.S. Cl.
    CPC ............ *G06F 21/602* (2013.01); *G06F 21/64* (2013.01); *H04L 9/0643* (2013.01); *H04L 9/3236* (2013.01); *G06F 2201/805* (2013.01)

(58) Field of Classification Search
    CPC .......... G06F 2201/805; G06F 21/6209; G06F 11/1458; G06F 21/62; H04L 9/0643; H04L 9/3236
    See application file for complete search history.

(56) References Cited

U.S. PATENT DOCUMENTS

| | | | |
|---|---|---|---|
| 9,374,222 B2 | 6/2016 | Kolesnikov et al. | |
| 2001/0056425 A1* | 12/2001 | Richard | G06F 11/1458 |
| 2003/0074569 A1 | 4/2003 | Yamauchi et al. | |
| 2005/0283662 A1 | 12/2005 | Li et al. | |
| 2008/0107275 A1 | 5/2008 | Asnaashari et al. | |
| 2009/0075630 A1 | 3/2009 | McLean et al. | |
| 2014/0149701 A1* | 5/2014 | Osada | G06F 11/1415 |
| | | | 711/162 |
| 2014/0189362 A1 | 7/2014 | Van Den Broeck et al. | |
| 2014/0282884 A1* | 9/2014 | Bao | G06F 21/6263 |
| | | | 726/4 |
| 2017/0220423 A1* | 8/2017 | Binford | G06F 3/0619 |

FOREIGN PATENT DOCUMENTS

| | | |
|---|---|---|
| JP | 2008-504592 A | 2/2008 |
| JP | 2010-509662 A | 3/2010 |
| JP | 2010-539856 A | 12/2010 |
| JP | 2014-525709 A | 9/2014 |
| WO | WO 2009-129192 A1 | 10/2009 |

OTHER PUBLICATIONS

JP 2007-86997 A, Abstract and machine translation, official action dated Dec. 16, 2021 in related Japanese application No. 2019-535334.

* cited by examiner

METHODS AND APPARATUS FOR PERFORMING SECURE BACK-UP AND RESTORE

CROSS REFERENCE TO RELATED APPLICATIONS

This application is the national stage entry under 35 U.S.C. § 371 of International Application PCT/EP2018/050474, filed Jan. 9, 2018, which was published in accordance with PCT Article 21(2) on Jul. 12, 2018, in English, and which claims the benefit of European Patent Application No. 17305020.4, filed Jan. 9, 2017.

TECHNICAL FIELD

The present invention relates to solutions for restoring configuration data. More particularly, the invention concerns methods for performing secure back-up of configuration data and easy restoring of said back-up data.

BACKGROUND

Existing communication devices, such as residential gateways, access points, repeaters, mobile phones, computers, etc. are configured according to different settings in order to behave as their users want.

Back-up procedures for saving those configuration data are provided which enables to restore said configuration data on the device when it is reset to default or on another device when the device is stolen or broken.

Since configuration data are sensitive data, it is important to protect their confidentiality and their integrity throughout the back-up and restore process.

Current solutions enable a secure back-up and restore process on the same device since the backed-up configuration data are encrypted using credentials that are only known to the device.

Thus, if the configuration data are to be restored on another device, the configuration data are stored in plaintext, i.e. they are not encrypted, allowing the restoration on said other device. This lack of security is a major drawback of existing back-up and restore solutions.

The present invention has been devised with the foregoing in mind.

SUMMARY OF INVENTION

According to a first aspect of the invention there is provided a computer implemented method for performing a secure back-up of configuration data of a first device, said method comprising:
  encrypting said configuration data and at least one identifier of a user of said first device, using a first pre-provisioned encryption key stored in a read only memory of said first device,
  encrypting a set of data obtained by hashing a combination of the encrypted configuration data and the at least one identifier of the user of said first device and a second pre-provisioned secret key stored in said read only memory of said first device,
  storing the encrypted configuration data and at least one identifier of the user of said first device and the encrypted set of data.

Such a solution provides a secure back-up process which enables the restoration of the backed-up data on the same device or on a distinct device. This is made possible by using encryption keys that are common to a pool of devices, such as devices of a same product model or devices of another product model manufactured by the same company and which is pre-loaded in a memory of said device.

Those common encryption keys are, for example, provided during the manufacturing of the devices and are stored in a section of a memory of the devices.

In an embodiment of the invention, the first pre-provisioned encryption key is a symmetric encryption key.

In an embodiment of the invention, the second pre-provisioned encryption key is common secret key.

In an embodiment of the invention, the secure back-up is performed at regular time intervals.

Such an embodiment does not require an action from the user of the device. It enables to have regular back-up which might prove useful depending on the sensitivity of the configuration data.

In an embodiment of the invention, the secure back-up is triggered by an action detected on a user interface of the first device.

The user of the device may trigger a back-up of the configuration data depending on his/her needs.

Another object of the invention concerns a computer implemented method for restoring configuration data on a first device, said method comprising:
  checking an integrity of the second set of data related to the configuration data to be restored using a first pre-provisioned secret key stored in a read only memory of said first device,
  when the integrity of the second set of data is checked, decrypting a second set of data comprising the configuration data using a second pre-provisioned decryption key stored in said read only memory of said first device,
  restoring the configuration data when at least one identifier of a user of said first device comprised in the decrypted second set of data matches at least one identifier of said user of said first device provided to the first device.

Such a solution enables to restore data securely backed-up on a first device on a second device. This is made possible by using pre-provisioned decryption keys that are common to a pool of devices, such as devices of a same product model or devices of another product model manufactured by the same company.

Those common pre-provisioned decryption keys are, for example, provided during the manufacturing of the devices and are stored in a section of a memory of the devices. Thus these decryption keys can be used do decrypt data encrypted with the encryption keys used by the same devices to encrypt their configuration data during the back-up process.

In such a solution, the integrity of the backed-up data is assured since if the integrity of the data to be restored is not checked, the restored process is stopped.

Furthermore, in order to increase the security of the overall process, data are restored on a device only if a final check is done. This final check consists in verifying that the user of the device on which the back-up was performed is the same user of the device on which the data are to be restored. Such a check is important since different devices use the same encryption and decryption keys.

In an embodiment of the invention, checking the integrity of a second set of data comprises:
  generating a third set of data by hashing a combination of the second set of encrypted data and the first pre-provisioned secret key, comparing said first set of data with the third set of data, the integrity of the first set of data being checked when the first set of data is identical to the third set of data.

Another object of the invention is an apparatus capable of performing a secure back-up of configuration data, said apparatus comprising a processor configured to:
encrypt said configuration data and at least one identifier of a user of said first device during a production of said first device and stored in a read only memory of said first device,
encrypt a set of data obtained by hashing a combination of the encrypted configuration data and the at least one identifier of the user of said first pre-provisioned device and a second pre-provisioned secret key stored in said read only memory of said first device,
store the encrypted configuration data and at least one identifier of the user of said first device and the encrypted set of data.

Another object of the invention is an apparatus capable of restoring configuration data on a first device, apparatus comprising a processor configured to:
check an integrity of the second set of data related to the configuration data to be restored using a first pre-provisioned secret key stored in a read only memory of said first device,
when the integrity of the second set of data is checked, decrypt that second set of data comprising the configuration data using a second pre-provisioned decryption key stored in said read only memory of said first device,
restore the configuration data when at least one identifier of a user of said first device comprised in the decrypted second set of data matches at least one identifier of said user of said first device provided to the first device.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

Figure 1:
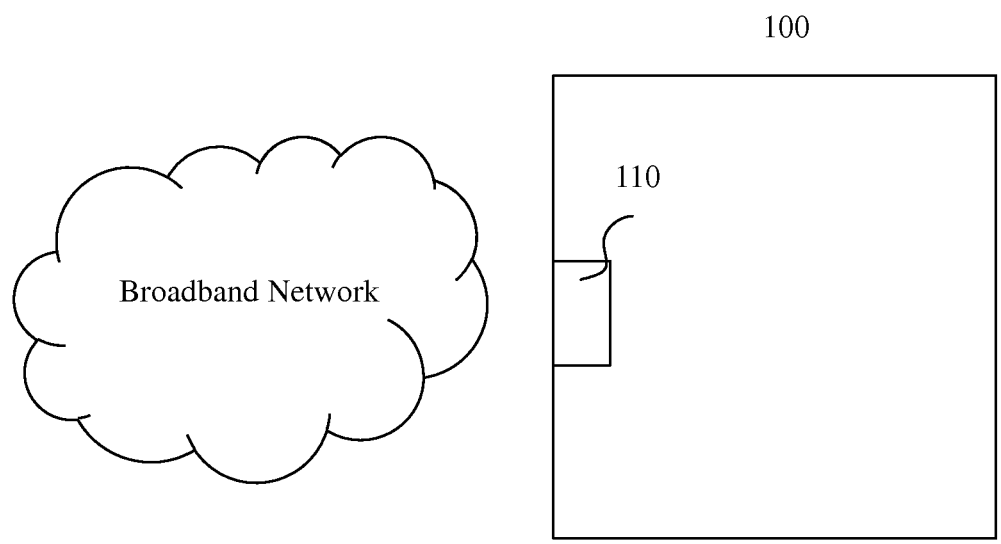
FIG. 1 represents a communication device implementing the back-up and restore methods according to an embodiment of the invention, FIG. 2 a schematic block diagram illustrating an example of the communication device according to an embodiment of the invention.

As represented on FIG. 1, a first communication device 100 is a home gateway. The first communication device 100 comprises at least one network interface 110 for communicating with a broadband network for example. Such a network interface 110 is for example configured to receive and transmit data from and to a DSLAM (Digital Subscriber Line Access Multiplexer) using xDSL (x Digital Subscriber Line) or from and to an OLT (Optical Line Termination) through an optical fiber.

In an embodiment of the invention, the first communication device 100 may embed both wireless and wired transmission interfaces.

Figure 2:
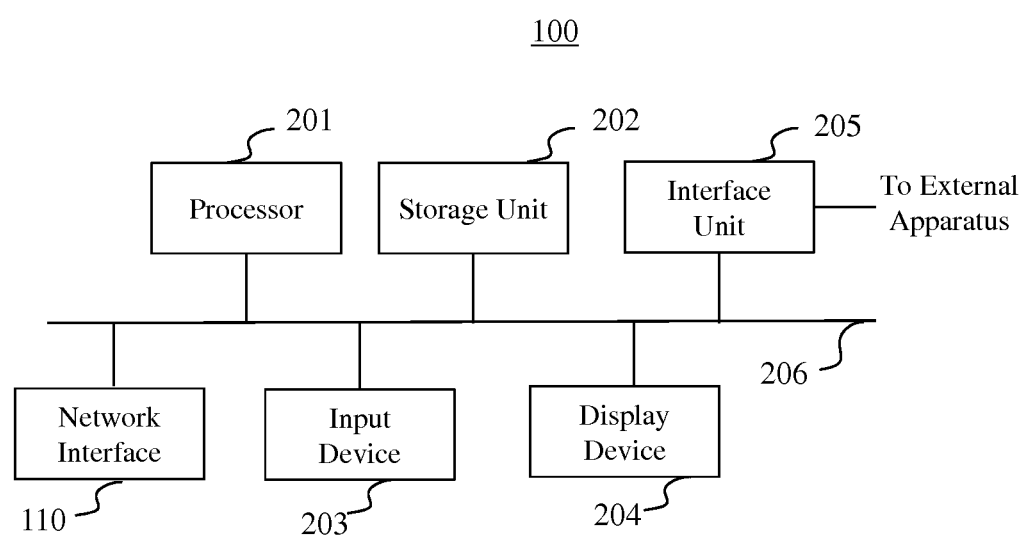

FIG. 2 is a schematic block diagram illustrating an example of the first communication device 100 according to an embodiment of the invention.

The first communication device 100 comprises a processor 201, a storage unit 202, an input device 203, a display device 204, and an interface unit 205 which are connected by a bus 206. Of course, constituent elements of the first communication device 100 may be connected by a connection other than a bus connection.

The processor 201 controls operations of the first communication device 100. The storage unit 202 stores at least one program capable of performing a secure back-up and restore of the configuration data of the first communication device 100, to be executed by the processor 201, and various data, parameters used by computations performed by the processor 201, intermediate data of computations performed by the processor 201, and so on. The processor 201 may be formed by any known and suitable hardware, or software, or a combination of hardware and software. For example, the processor 201 may be formed by dedicated hardware such as a processing circuit, or by a programmable processing unit such as a CPU (Central Processing Unit) that executes a program stored in a memory thereof.

The storage unit 202 may be formed by any suitable storage or means capable of storing the program, data, or the like in a computer-readable manner. Examples of the storage unit 202 include non-transitory computer-readable storage media such as semiconductor memory devices, and magnetic, optical, or magneto-optical recording media loaded into a read and write unit. The program causes the processor 201 to perform a process of secure back-up and restore according to an embodiment of the present disclosure as described hereinafter with reference to FIGS. 3 and 4.

The input device 203 may be formed by a keyboard, a pointing device such as a mouse, or the like for use by the user to input commands, to make user's selections of parameters used for selecting the transmission interface to be used. The output device 204 may be formed by a display device to display, for example, a Graphical User Interface (GUI). The input device 203 and the output device 204 may be formed integrally by a touchscreen panel, for example.

The interface unit 205 provides an interface between the first communication device 100 and an external apparatus. The interface unit 205 may be communicable with the external apparatus via cable or wireless communication. In an embodiment, the external apparatus may be an optical acquisition system such as an actual camera.

The invention may be executed in devices other than gateways, such as mobile phones, computers, captors, etc.

Figure 3:
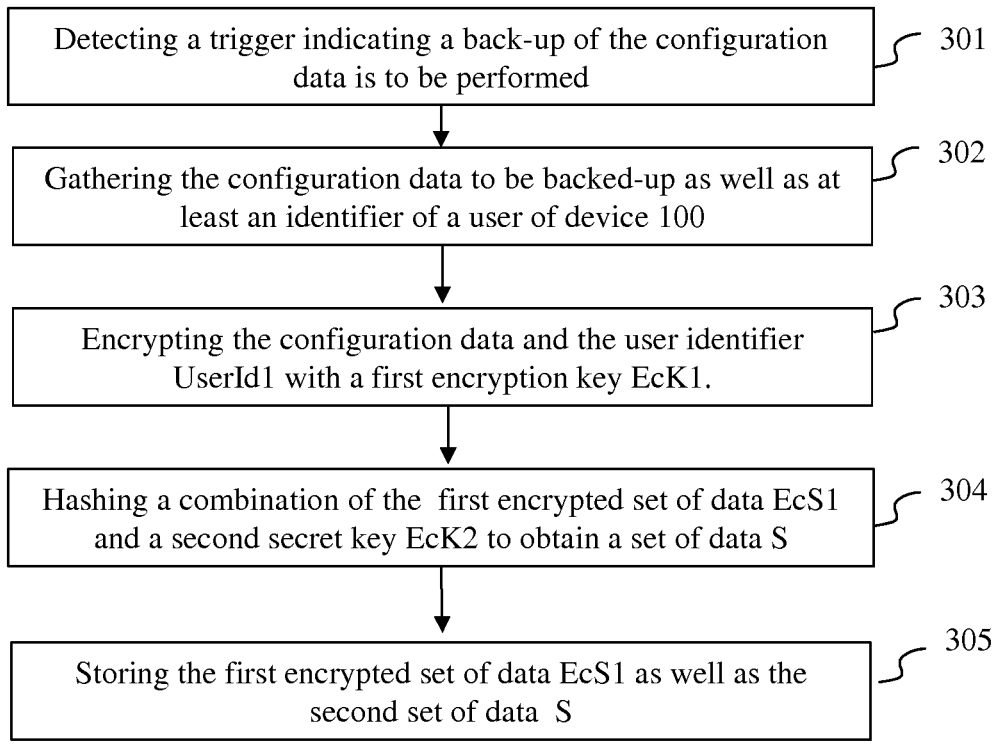
FIG. 3 represents a flow chart for explaining a process for performing a secure back-up of configuration data according to an embodiment of the invention.

FIG. 3 is a flow chart for explaining a process for performing a secure back-up of configuration data. The invention relies on the use of a shared secret, such as encryption and secret keys, between the device for which data are to be back-up and the device on which said backed-up data are to be restored. Those two devices may be one and the same or distinct devices. The user of the devices does not need to configure the devices with the shared secret.

In a step 301, the processor 201 detects a trigger indicating that a back-up of the configuration data of device 100 is to be performed.

In a first embodiment of the invention, the trigger is the expiration of a timer. For example, a back-up of the configuration data of device 100 is scheduled every day or every hour, or every X minutes, etc. depending on the sensitivity of the configuration data.

In another embodiment of the invention, the trigger is the detection of an action on the input device 203. In this case the detection of this action triggers the back-up process.

In a step 302, the processor 201 gathers the configuration data to be backed-up as well as at least an identifier of a user UserId1 of device 100, such as a customer identifier, a phone number, etc.

In a step 303, the configuration data and the user identifier UserId1 are encrypted using a first pre-provisioned encryption key EcK1. Those encrypted data consist in a first encrypted set of data EcS1.

Such a first encryption key EcK1 is for example provisioned during the manufacturing of device 100 and more generally in all the devices of the same product model as device 100 or devices of other product models of the same manufacturer. The first pre-provisioned encryption key EcK1 consists in truly random data created by a Hardware Security Module (HSM). The first pre-provisioned encryption key EcK1 is stored in a partition of the storage unit 202.

The first pre-provisioned encryption key is a symmetric key according, for example, to the AES-256 protocol (Advanced Encryption Standard).

The first pre-provisioned encryption key EcK1 may also be generated by the processor 201 using an encryption common to all the devices of the same product model as device 100 or devices of other product models of the same manufacturer as well as an identifier of the product model and an identifier of the device 100 such as a serial number.

In a step 304, a second set of data S is obtained by hashing a combination of the first pre-provisioned encrypted set of data EcS1 and a second pre-provisioned secret key EcK2.using, for example, an HMAC scheme (keyed-Hash Message Authentication Code).

Such a second pre-provisioned secret key EcK2 is for example provisioned during the manufacturing of device 100 and more generally in all the devices of the same product model as device 100 or devices of other product models of the same manufacturer. The second pre-provisioned secret key EcK2 consists in truly random data created by a Hardware Security Module (HSM). The second pre-provisioned secret key EcK2 is stored in a partition of the storage unit 202.

The second pre-provisioned secret key EcK2 may also be generated by the processor 201 using an encryption common to all the devices of the same product model as device 100 or devices of other product models of the same manufacturer as well as an identifier of the product model and an identifier of the device 100 such as a serial number.

In an embodiment of the invention, the first pre-provisioned encryption key EcK1 and second pre-provisioned secret key EcK2 are transmitted to the device 100 by a third party such as the manufacturer of the device 100 or a provider managing the device 100. The first pre-provisioned encryption key EcK1 and the second pre-provisioned secret key EcK2 are common to all devices of the same product model as device 100 or devices of other product models of the same manufacturer, enabling the secret to be shared between different devices.

The second set of data S obtained during step 304 is used to check the integrity of the backed-up configuration data during the restoring process.

In a step 305, the processor 201 stores the first encrypted set of data EcS1 comprising the encrypted configuration data and at least one identifier of the user of device a100 as well as the second set of data S.

Those data are stored either in the storage unit 202 of device 100 or in a remote server. This later embodiment enables to remotely retrieve the data needed for restoring a configuration on a device.

Figure 4:
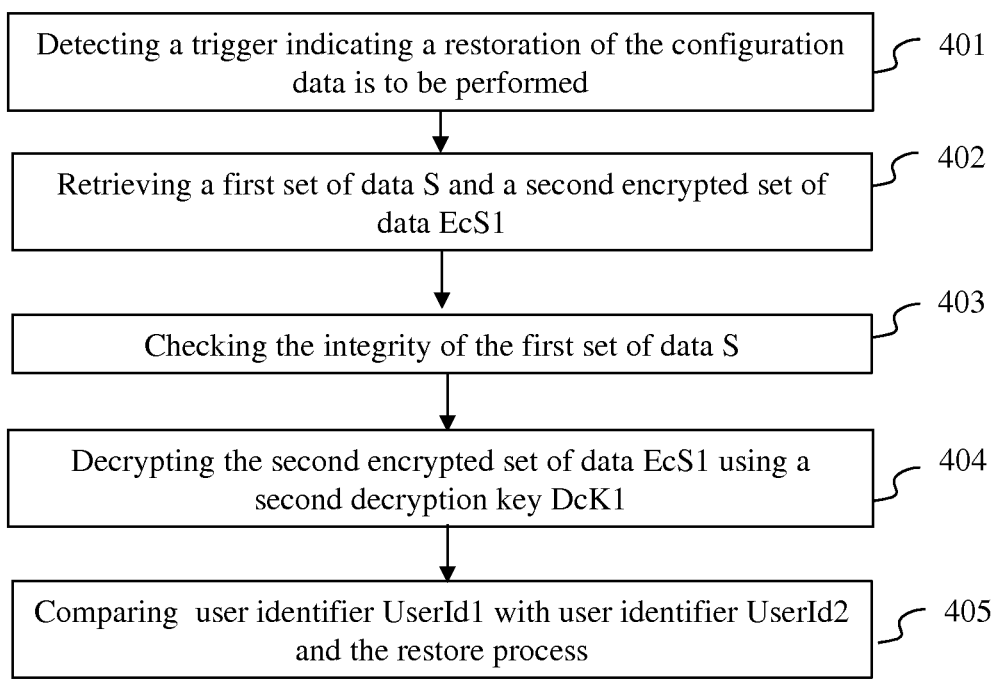
FIG. 4 represents a flow chart for explaining a process for restoring securely backed-up configuration data according to an embodiment of the invention.

FIG. 4 is a flow chart for explaining a process for restoring securely backed-up configuration data. The invention relies on the use of a shared secret, such as decryption and secret keys, between the device for which data are backed-up and the device on which said backed-up data are to be restored. Those two devices may be one and the same or distinct devices. The user of the devices does not need to configure the devices with the shared secret.

In a step 401, the processor 201 detects a trigger indicating that a restore of the configuration data of device 100 is to be performed.

In an embodiment of the invention, the trigger is the detection of an action on the input device 203 such as a reset command or a boot command. In another embodiment, the trigger is the detection of an action on the input device 203. In this case the detection of this action triggers the restore process.

In a step 402, the processor 201 retrieves a first set of data S and a second encrypted set of data EcS1. The first set of data S is used to check the integrity of the second encrypted set of data EcS1, while the second encrypted set of data EcS1 comprises the configuration data needed to complete the restore process.

In an embodiment, the restoring of the configuration takes place on the same device 100. In this case, the processor 201 may retrieve the first set of data S and the second encrypted set of data EcS1 in the storage unit 202.

In another embodiment, the restoring of the configuration takes place on another device such as a device of the same product model as device 100 or a device of another product model of the same manufacturer. In this case, the processor 201 may retrieve the first set of data S and the second encrypted set of data EcS1 from a remote server.

In a step 403, the processor 201 checks the integrity of the second encrypted set of data EcS1. The processor 201 checks the integrity of said second encrypted set of data EcS1 using a first pre-provisioned secret key DcK2 which corresponds to the second pre-provisioned secret key EcK2 used during the back-up process described in reference to FIG. 3.

The first pre-provisioned secret key DcK2 is for example provisioned during the manufacturing of device 100 and more generally in all the devices of the same product model as device 100 or devices of other product models of the same manufacturer. The first pre-provisioned secret key DcK2 consists in truly random data created by a Hardware Security Module (HSM). The first pre-provisioned secret key DcK2 is stored in a partition of the storage unit 202.

The first pre-provisioned secret key DcK2 may also be generated by the processor 201 using an encryption common to all the devices of the same product model as device 100 or devices of other product models of the same manufacturer as well as an identifier of the product model and an identifier of the device 100 such as a serial number.

The processor 201 generates a third set of data S' by hashing a combination of the second set of encrypted data EcS1 and the second pre-provisioned secret key EcK2 using, for example, an HMAC scheme and compares the first set of data S with the third set of data S'.

If the first set of data S and the third set of data S' are identical, then the processor 201 executes step 404, if they are different, then the restore process is stopped.

During step 404, the processor 201 decrypts the second encrypted set of data EcS1 using a second pre-provisioned decryption key DcK1 which corresponds to the first pre-provisioned encryption key EcK1 used during the back-up process described in reference to FIG. 3.

The second pre-provisioned decryption key DcK1 is for example provisioned during the manufacturing of device 100 and more generally in all the devices of the same product model as device 100 or devices of other product models of the same manufacturer. The second pre-provisioned decryption key DcK1 consists in truly random data created by a Hardware Security Module (HSM). The second decryption key DcK1 is stored in a partition of the storage unit 202.

The second pre-provisioned decryption key DcK1 is a symmetric key according to the AES-256 protocol (Advanced Encryption Standard).

The second pre-provisioned decryption key DcK1 may also be generated by the processor 201 using an encryption common to all the devices of the same product model as device 100 or devices of other product models of the same manufacturer as well as an identifier of the product model and an identifier of the device 100 such as a serial number.

The first pre-provisioned secret key DcK2, and the second pre-provisioned decryption DcK1, are common to all devices of the same product model as device 100 or devices of other product models of the same manufacturer, enabling the secret to be shared between different devices.

In an embodiment of the invention, the first pre-provisioned secret key DcK2 and second pre-provisioned decryption key DcK1 are transmitted to the device 100 by a third party such as the manufacturer of the device 100 or a provider managing the device 100.

If the decryption of the second encrypted set of data EcS1 is not possible, meaning the device performing the restore process is not an authorized device, then the restore process is stopped.

If the decryption of the second encrypted set of data EcS1 is successful, the configuration data as well as at least one user identifier UserId1 are retrieved by the processor 201.

In a step 405, the processor 201 compares the user identifier UserId1 retrieved during step 404 with a second user identifier UserId2 provided locally to the device executing the restore process. The first user identifier UserId1 and the second user identifier UserId2 may be the same, e.g. they may be the phone number of the user of device 100.

If the two user identifiers UserId1 and UserId2 match, then the processor 201 can perform the restoring of the configuration data, if the user identifiers UserId1 and UserId2 do not match, the restore process is stopped.

The second user identifier UserId2 may be provided locally through the input device 203 or remotely using processes such as TR-69 before the beginning of the restore process.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method for performing a back-up of configuration data of a device, said method comprising:
   encrypting said configuration data and at least one identifier of a user of said device, using a first pre-provisioned encryption key stored in a read only memory of said device;
   encrypting a set of data obtained by processing a combination of the encrypted configuration data and the at least one identifier of the user of said device and a second pre-provisioned secret key stored in said read only memory of said device, wherein the first pre-provisioned encryption key and the second pre-provisioned secret key are common to devices of a same manufacturer; and
   storing the encrypted configuration data and the at least one identifier of the user of said device and the encrypted set of data.

2. The method of claim 1, wherein the first pre-provisioned encryption key is a symmetric encryption key.

3. The method of claim 1, wherein the back-up is performed at regular time intervals.

4. The method of claim 1, wherein the back-up is triggered by an action detected on a user interface of the device.

5. A method for restoring data on a device, said method comprising:
   retrieving, from the data, a first set of data and a second set of encrypted data;
   checking an integrity of the first set of data, related to configuration data to be restored on the device, using a first pre-provisioned secret key stored in a read only memory of said device;
   when the integrity of the first set of data is checked, decrypting the first set of data comprising the configuration data using a second pre-provisioned decryption key stored in said read only memory of said device, wherein the first pre-provisioned secret key and the second pre-provisioned decryption key are common to devices of a same manufacturer; and restoring the configuration data when at least one identifier of a user of said device comprised in the decrypted first set of data matches at least one identifier of said user of said device provided to the device.

6. The method of claim 5, wherein checking the integrity of the first set of data comprises:

generating a third set of data by hashing a combination of the second set of encrypted data and the first pre-provisioned secret key; and comparing said first set of data with the third set of data, the integrity of the first set of data being checked when the first set of data is identical to the third set of data.

7. The method of claim 1, wherein processing said combination comprises hashing said combination.

8. A non-transitory processor readable medium having instructions stored therein for causing a processor to perform the method according to claim 7.

9. A device for performing a back-up of configuration data, comprising:

a storage unit; and a processor configured to:

encrypt said configuration data and at least one identifier of a user of said device, using a first pre-provisioned encryption key in a read only memory of said device;

encrypt a set of data obtained by processing a combination of the encrypted configuration data and the at least one identifier of the user of said device and a second pre-provisioned secret key stored in said read only memory of said device, wherein the first pre-provisioned encryption key and the second pre-provisioned secret key are common to devices of a same manufacturer; and store the encrypted configuration data and the at least one identifier of the user of said device and the encrypted set of data.

10. The device of claim 9, wherein the set of data obtained by processing said combination is obtained by hashing said combination.

11. A device for restoring data, comprising:

a storage unit; and a processor configured to:

retrieve, from the data, a first set of data and a second set of encrypted data;

check an integrity of the first set of data, related to configuration data to be restored on the device, using a first pre-provisioned secret key stored in a read only memory of said device;

when the integrity of the first set of data is checked, decrypt the first set of data comprising the configuration data using a second pre-provisioned decryption key stored in said read only memory of said device, wherein the first pre-provisioned secret key and the second pre-provisioned decryption key are common to devices of a same manufacturer; and restore the configuration data when at least one identifier of a user of said device comprised in the decrypted first set of data matches at least one identifier of said user of said device provided to the device.

12. A non-transitory processor readable medium having stored therein instructions for causing a processor to perform the method according to claim 1.

13. A method for performing a back-up of configuration data of a device, said method comprising:

encrypting said configuration data and at least one identifier of a user of said device, using a first encryption key provided by a third party and stored in a read only memory of said device;

encrypting a set of data obtained by hashing a combination of the encrypted configuration data and the at least one identifier of the user of said device and a second secret key provided by a third party and stored in said read only memory of said device, wherein the first encryption key and the second secret key are common to devices of a same manufacturer;

storing the encrypted configuration data and the at least one identifier of the user of said device and the encrypted set of data.

14. A non-transitory processor readable medium having stored therein instructions for causing a processor to perform the method according to claim 5.

15. A method for restoring data on a device, said method comprising:

retrieving, from the data, a first set of data and a second set of encrypted data;

checking an integrity of the first set of data, related to configuration data to be restored on the device, using a first secret key provided by a third party and stored in a read only memory of said device;

when the integrity of the first set of data is checked, decrypting the first set of data comprising the configuration data using a second decryption key provided by a third party and stored in said read only memory of said device, wherein the first secret key and the second decryption key are common to devices of a same manufacturer; and restoring the configuration data when at least one identifier of a user of said device comprised in the decrypted first set of data matches at least one identifier of said user of said device provided to the device.

16. A non-transitory processor readable medium having instructions stored therein for causing a processor to perform the method according to claim 13.

17. A non-transitory processor readable medium having instructions stored therein for causing a processor to perform the method according to claim 15.

* * * * *